UNITED STATES PATENT OFFICE.

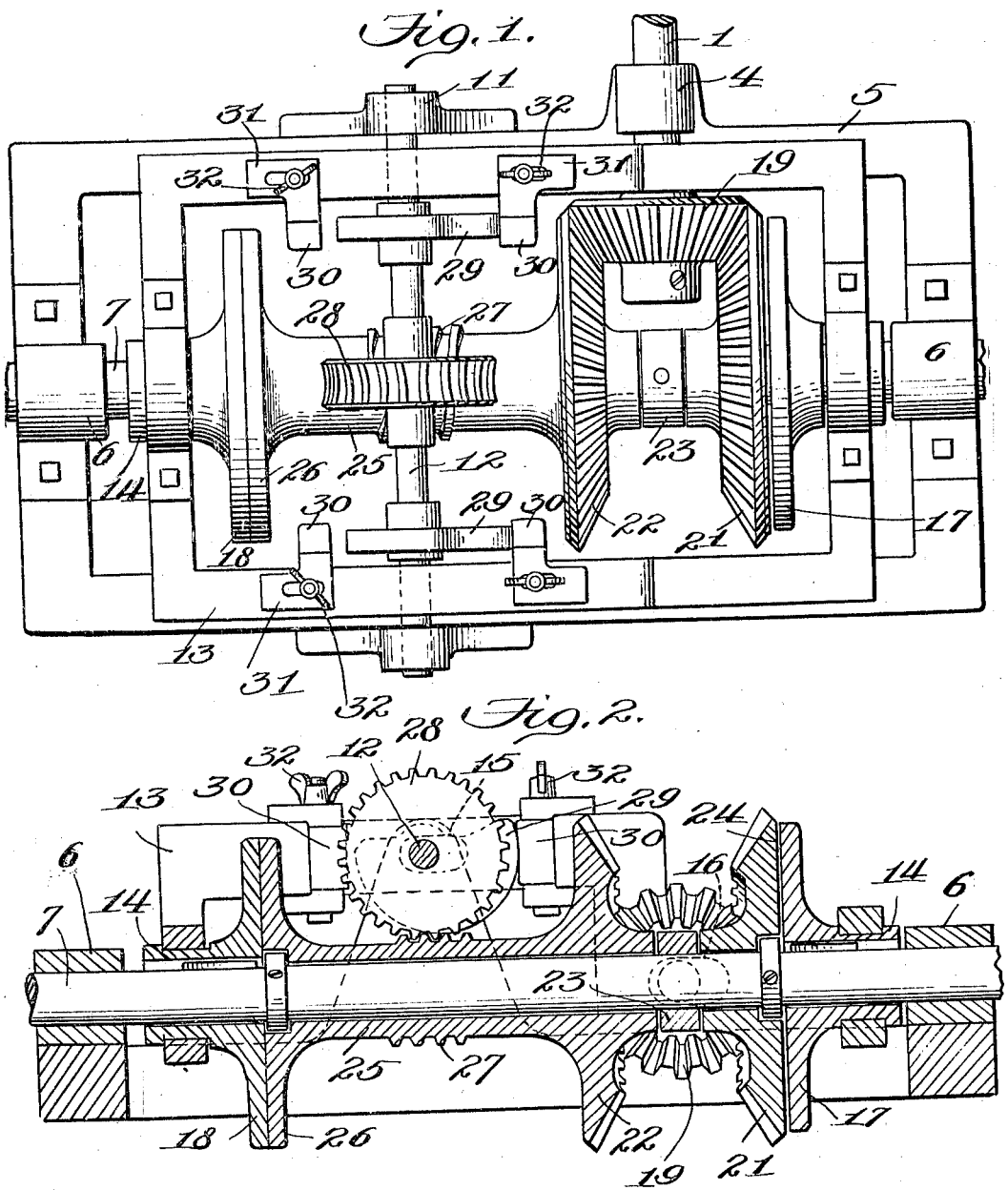

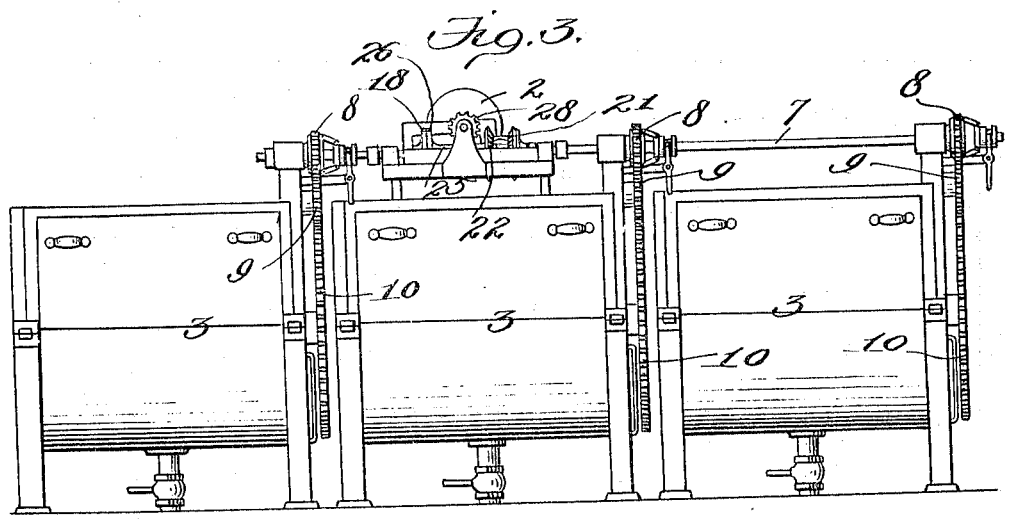
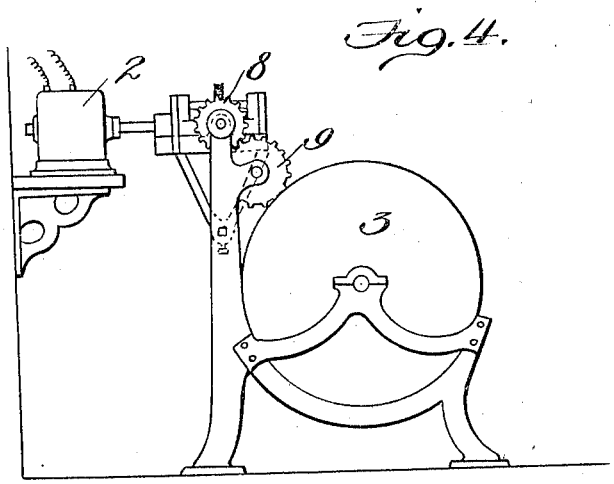

PRENTICE E. CLARK, OF ELKINS, WEST VIRGINIA.

TRANSMISSION-GEARING.

951,055.  Specification of Letters Patent.  Patented Mar. 1, 1910.

Application filed March 8, 1909. Serial No. 481,925.

*To all whom it may concern:*

Be it known that I, PRENTICE E. CLARK, a citizen of the United States, residing at Elkins, in the county of Randolph and State of West Virginia, have invented new and useful Improvements in Transmission-Gearing, of which the following is a specification.

This invention relates to new and useful improvements in transmission gearing for converting continuous rotary motion into alternating rotary motion and is especially adapted for use in laundry plants in connection with a gang of laundry machines. The invention is not limited to this particular application, however, but may be employed in other connections wherein an alternating rotary motion may be necessary or advantageous as, for example, in hide working machinery and in divers other connections.

The ultimate purpose of the invention is to provide a transmission gearing in which the change in the relations of the gears in the motion reversing operation is slow and gradual but certain. In this manner wear and tear upon the gears is reduced, the life of the apparatus is materially prolonged and the agitators of the washing machines are kept moving at a substantially uniform speed.

Toward the end of accomplishing the above object, the apparatus more particularly comprises two oppositely driven gear wheels which are loosely mounted on the main shaft and which are provided with clutch faces for coöperation with axially movable clutch elements. The arrangement is such that when one of the axially movable clutch elements is driven by its companion driving gear, the other clutch element is out of engagement with the clutch face of its companion driving gear and vice versa. These clutch elements are in the preferred form of the invention mounted upon a sliding frame and the invention includes specifically novel means for reciprocating this frame.

In the accompanying drawings I have illustrated a preferred and advantageous form of the invention by which the objects above stated are carried out, the details of such embodiment being set forth at length in the following description.

In the said drawings: Figure 1 is a top plan view of transmission gearing constructed in accordance with the present invention. Fig. 2 is a longitudinal sectional view thereof. Fig. 3 is a front elevation of a gang of washing machines showing the application of my improved gearing thereto, and Fig. 4 is a side elevation showing the application of my improved gearing to a washing machine or to a gang of washing machines.

Similar characters of reference refer to corresponding parts throughout the several views.

In Fig. 1 the numeral 1 indicates the shaft of a suitable motor, as 2, shown more particularly in Fig. 4 and which is preferably an electric motor.

The invention is illustrated in connection with a gang of washing machines, as 3. While this application of the invention is of particular advantage, it is not obligatory. The shaft 1 is journaled in a bearing 4 which is formed upon a rectangular skeleton supporting base, as 5, the latter being stationary and having at its ends bearings, as 6, for the transmission shaft, as 7. The shaft 7 extends longitudinally of the series of washing machines which are arranged in conterminous relation and at suitable intervals is provided with pinions, as 8, which mesh with intermediate larger pinions, as 9, the latter in turn driving the large size pinions 10 which are connected to the stirrer arms or agitators of the several washing machines. By virtue of this arrangement of gears 7, 8 and 9, the said stirrer arms are caused to rotate very slowly, even with a motor designed to run at an unusually high speed. The frame 5 is provided at each side thereof with upstanding bearings, as 11, for a transverse shaft 12, which is employed, through the intermediary of means to be later described, to operate a slidable frame 13, the latter being of substantially rectangular form and having its end bars formed with collars 14 which surround the shaft 7. The shaft 12 extends through longitudinal slots, as 15, which are formed in the side bars of the frame 13 and the shaft 1 extends through a longitudinal slot, as 16, which is formed in the adjacent side bars of said frame 13.

The shaft 7 is driven alternately in opposite directions through the agency of clutch elements 17 and 18 which are keyed to the shaft 7 and are connected to the end bar of the frame 13 so as to move axially therewith and with respect to the shaft 7, but rotatably with respect to the frame 13 and in turn rotating the shaft 7. The clutch elements 17 and 18 are preferably in the form of friction clutch disks, this particular type of clutch element having been found to be the most practical for carrying out the purposes contemplated. Intermediate gearing is employed for driving the disks 17 and 18, such intermediate gearing being constructed as follows. The shaft 1 has an end projecting within the confines of the frame 13 and carrying a bevel pinion, as 19, which is fast on said shaft and which simultaneously drives in opposite directions two bevel pinions, as 21 and 22, the latter being loose on the shaft 7 and being spaced from one another by a suitable collar, as 23. The pinion 21 has its outer face, as 24, so constructed that said pinion constitutes also a friction clutch disk for driving the disk 17. The pinion 22 has an axially extended sleeve, as 25, which surrounds the shaft 7 and terminates in an enlarged flange, as 26, the latter also constituting a friction clutch disk and driving the disk 18. Having thus established the relation of the parts it will be understood that when the disk 18 is in contact with the clutch element 26, the disk 17 is out of contact with the clutch element 24 and vice versa. Owing to the fact that the pinions 21 and 22 rotate in opposite directions, the disk 24 will, through the agency of the disk 17, drive the shaft 7 in one direction and the pinion 22 will, through the agency of the disks 26 and 18, drive the shaft 7 in an opposite direction.

It has been said that the disks 17 and 18 are connected to the frame 13 for axial movement therewith, this being the preferred arrangement. Accordingly, means are provided for shifting said frame longitudinally so as to engage one disk or the other with its companion element and the preferred embodiment of such means is as follows. The sleeve 25 is formed with an intermediate worm gear, as 27, which meshes with a worm wheel, as 28, the latter being fast upon the shaft 12. The shaft 12 is employed as the operating element of the frame shifting means and accordingly is provided at points near the side bars of the frame 13 with similarly arranged and proportioned cams, as 29, the latter coöperating with lugs, as 30, which are secured to the side bars of the frame 13. The lugs 30 are mounted upon the side bars for adjustment longitudinally thereof and accordingly are of substantially L shape, having slotted extensions, as 31, through which securing thumb screws, as 32, extend, the screws 32 being threaded into the side bars of the frame 13.

In operation it is proposed that the agitators shall rotate a desired number of times in one direction and then a desired number of times in the reverse direction and this action is accomplished by the gearing herein described. It will be apparent that the wheels 21 and 22 are driven continuously in opposite directions and that the wheel 22, through the medium of the worm 27 and worm wheel 28, operates the shaft 12, the latter by virtue of the cams 29 and lugs 30, shifting the frame 13 longitudinally in alternately opposite directions, whereby the disks 18 and 26 are first engaged and then the disks 17 and 24 and so on in the manner explained. The shifting movement of the frame 13 is at a comparatively slow rate of speed and the engagement between the clutch members is gradual and yet certain. In this manner shocks and sudden vibrations are effectually eliminated and the speed of rotation of the shaft 7 is substantially uniform in both directions.

The invention while efficiently attaining the objects for which it is designed, does not sacrifice the incidental requirements of strength, efficiency and practicability and may be inexpensively manufactured and readily set up and dismantled.

Having fully described my invention, I claim:

1. In transmission gearing of the type set forth, in combination, a driven shaft, two oppositely rotatable gear wheels each having a clutch face, a reciprocatory frame, rotatable clutch elements carried by the frame for driving said shaft and slidably related thereto, one clutch element being in operative relation to its companion clutch face while the other clutch element is in inoperative relation to its companion clutch face and means for reciprocating the frame including a rotatable cam and a pair of lugs arranged on each side of the cam and alternately engaged thereby to cause reciprocation of the frame.

2. In transmission gearing of the type set forth, in combination, a driven shaft, two oppositely rotatable gear wheels for driving the shaft, each gear wheel having a clutch face, a reciprocatory frame, rotatable clutch elements carried by the frame for driving the shaft and slidably related thereto, one clutch element being in operative relation to its companion clutch face while the other clutch element is in inoperative relation to its companion clutch face, a transverse shaft, a rotatable cam mounted thereon, means for driving the transverse shaft, and a pair of lugs on the frame arranged at each side of the cam for alternate engagement thereby.

3. In transmission gearing of the type set forth, in combination, two oppositely rotatable gear wheels each having a clutch face, two clutch elements, each driven from a corresponding clutch face and axially alined therewith, an axially movable carriage to which the clutch elements are rotatably connected, a shaft driven alternately in opposite directions by said clutch elements and means for causing reciprocatory axial movements of the carriage, and comprising a shaft, a cam thereon, a pair of lugs provided on the carriage for engagement by the cam, a worm connected to one of the gear wheels and a worm wheel mounted on the last named shaft and in mesh with the worm.

4. In transmission gearing of the type set forth, in combination, a driven shaft, a pair of oppositely rotatable gear wheels mounted thereon and having at their outer sides friction clutch faces, a reciprocating carriage, a friction clutch element rotatably mounted at each end of the carriage for coöperation with a companion clutch face, the clutch elements driving the shaft and being slidably related thereto and means for reciprocating the carriage including a rotatable cam and means on the frame and associated with opposite sides of the cam for alternate engagement thereby.

5. In transmission gearing of the type set forth, in combination, a driven shaft, a pair of oppositely rotatable bevel gear wheels mounted thereon and having at their outer sides friction clutch faces, an intermediate bevel gear for positively driving the first-named gear wheels, a reciprocating member, a friction clutch element for engagement with each clutch face, and means for reciprocating the member to produce the alternate engagement and disengagement of the clutch elements and the corresponding clutch faces and including a rotatable cam and means on the member and associated with opposite sides of the cam for alternate engagement thereby.

6. In transmission gearing of the type set forth, two oppositely rotatable bevel gear wheels having common direct driving means and having at relatively opposite sides thereof friction clutch surfaces, a shaft passing loosely through the gear wheels and driven alternately in opposite directions thereby, a friction clutch element slidably keyed on the shaft, for engagement with each clutch surface, a reciprocatory member with respect to which the clutch elements are rotatable, the member producing the alternate engagement and disengagement of said elements and the corresponding clutch faces, and means for reciprocating the member, including a rotatable cam, means on the member and associated with opposite sides of the cam for alternate engagement thereby, and reducing gear for operating the cam from the driving means.

In testimony whereof I have hereunto set my hand in presence of two subscribing witnesses.

PRENTICE E. CLARK.

Witnesses:
 N. G. KEIM,
 G. PALMER.